United States Patent

[11] 3,586,180

| [72] | Inventor | James D. Brock |
| | | Chattanooga, Tenn. |
| [21] | Appl. No. | 821,352 |
| [22] | Filed | May 2, 1969 |
| [45] | Patented | June 22, 1971 |
| [73] | Assignee | CMI Corporation |
| | | Oklahoma City, Okla. |

[54] DISPENSING AND CONVEYING APPARATUS FOR HOT MIX PLANT
5 Claims, 3 Drawing Figs.

[52] U.S. Cl............................................. 214/17,
198/54, 214/41, 222/483
[51] Int. Cl......................................... B65g 65/42
[50] Field of Search........................................... 214/17,
17.8, 41, 16, 83.18, 83.2; 222/279, 483, 485;
198/54, 56, 68, 174

[56] References Cited
UNITED STATES PATENTS

| 3,233,873 | 2/1966 | Sackett.......................... | 198/174 X |
| 3,322,289 | 5/1967 | Wendell et al................ | 214/41 |
| 3,448,876 | 6/1969 | Mosman et al. .............. | 214/83.2 |

Primary Examiner—Robert G. Sheridan
Attorney—Jones and Thomas

ABSTRACT: A dispensing and conveying apparatus for a hot mix plant of the type utilized to prepare and store hot asphalt mix which includes an elevated mix preparation plant, an elevated storage silo, and means for selectively dispensing hot mix directly from the mix preparation plant to a vehicle or for conveying the hot mix from the lower portion of the mix preparation plant to the upper portion of the storage silo.

PATENTED JUN22 1971　　3,586,180

JAMES DONALD BROCK, INVENTOR

BY Jones & Thomas

ATTORNEYS

DISPENSING AND CONVEYING APPARATUS FOR HOT MIX PLANT

BACKGROUND OF THE INVENTION

When manufacturing a hot asphalt mix for use in the preparation of road surfaces and the like, the mix usually must be prepared in large quantities, and trucks or other vehicles carry the prepared mix from the place where it is being manufactured to the construction site. The mix is usually prepared in an elevated structure so that it can be dispensed directly into the body of a truck, and the structure usually includes an aggregate grader or vibrating screen, bins for receiving the aggregate from the screens, an aggregate batcher and bitumen batcher, and a pugmill mixer. These elements are usually oriented one above the other in a vertical arrangement so that the mix is prepared as the aggregate travels in a downward direction through the assembly and the asphalt mix is dispensed directly from the pugmill mixer into the bed of a truck or to a conveyor system. Since the timing of the trucks arriving at the plant site may not correspond to the speed at which the mix is being prepared, most of the larger plants also include a storage device, such as a silo where the mix is conveyed from the lower area of the mix preparation plant to the upper portion of the storage silo. The storage silo can be an unheated surge bin which holds the heated mix for a short period of time until a truck arrives at the plant site, or can be a heated storage silo which is able to maintain the mix in a heated condition for prolonged periods of time so as to provide a continuous supply of mix at all times.

In order to transfer the prepared mix from the mix preparation plant to the storage device in the prior art plants, the mix has been dispensed into a hopper or similar device and guided to an inclined conveyor system where the mix is elevated to the upper portion of the surge bin or heated storage silo. Since it is desirable to maintain the lower portion of the mix preparation plant unencumbered with a conveying mechanism in order that trucks or similar vehicles can be loaded directly from the mix preparation plant, the mix has been transferred to the conveyor system in the past by extending a portable conveyor beneath the mix preparation plant to feed the inclined conveyor system. The portable conveyors usually comprise a track and roller system which extends beneath the mix preparation plant and an auger or drag chain conveyor suspended from the tracks and which is movable to a position beneath the mix preparation plant and connectable to the inclined conveyor system, or to a position removed from beneath the plant to allow a truck to enter the space below the plant.

While the prior art portable conveyor system has been effective to some extent in performing the transfer of the mix to the inclined conveyor, the presence of both an inclined conveyor and a portable conveyor makes the plant structure expensive. Furthermore, the removal and replacement of the portable conveyor with respect to the mix preparation plant is somewhat cumbersome in that when a truck approaches the mix preparation plant the batch of mix passing through the portable conveyor must be cleared to the inclined conveyor, the operation of the portable conveyor must be terminated, the portable conveyor must be displaced from beneath the mix preparation plant, the truck then must be located beneath the plant and filled with mix, the truck must be removed, the portable conveyor must be repositioned beneath the plant, and the operation of the portable conveyor must be started before the transfer of mix from the mix preparation plant to the surge bin or heated storage silo can be continued. Of course, this procedure is time consuming and requires the presence and attention of a portable conveyor operator.

SUMMARY OF THE INVENTION

Briefly described, the present invention comprises a dispensing and conveying apparatus for a hot mix plant which functions to divert mix normally being dispensed to a conveyor system to a truck or similar vehicle, and which does not require the removal of any portion of the conveying system from beneath the mix preparation plant when the mix is being dispensed to the truck. Only a single conveyor mechanism is utilized to transfer the prepared mix from the mix preparation plant to the surge bin or heated storage silo, and the conveyor mechanism can be continuously operated, if desired. The structure is arranged so that a truck can be parked beneath the mix preparation plant while the conveyor system is operating to transfer a batch of prepared mix from the plant to the surge bin.

Thus, it is an object of this invention to provide a dispensing and conveying apparatus for a hot mix plant which allows the transfer of mix from a mix preparation plant to a storage silo while a truck or the like is positioned beneath the mix preparation plant.

Another object of this invention is to provide a conveying mechanism in combination with a hot mix preparation and storage plant which extends from beneath the mix preparation plant in primarily a lateral direction and then extends in an inclined direction toward the upper portion of a storage silo, or the like.

Another object of this invention is to provide a hot mix transfer mechanism for use with a hot mix preparation and storage apparatus which is inexpensive to construct and maintain, easy and expedient to operate, and which allows access to the lower portion of the mix preparation plant by a truck, or the like, while in operation.

Other objects, features and advantages of the present invention will become apparent upon reading the following specification, when taken in conjunction with the accompanying drawing.

DESCRIPTION OF THE PREFERRED EMBODIMENT

Figure 1:
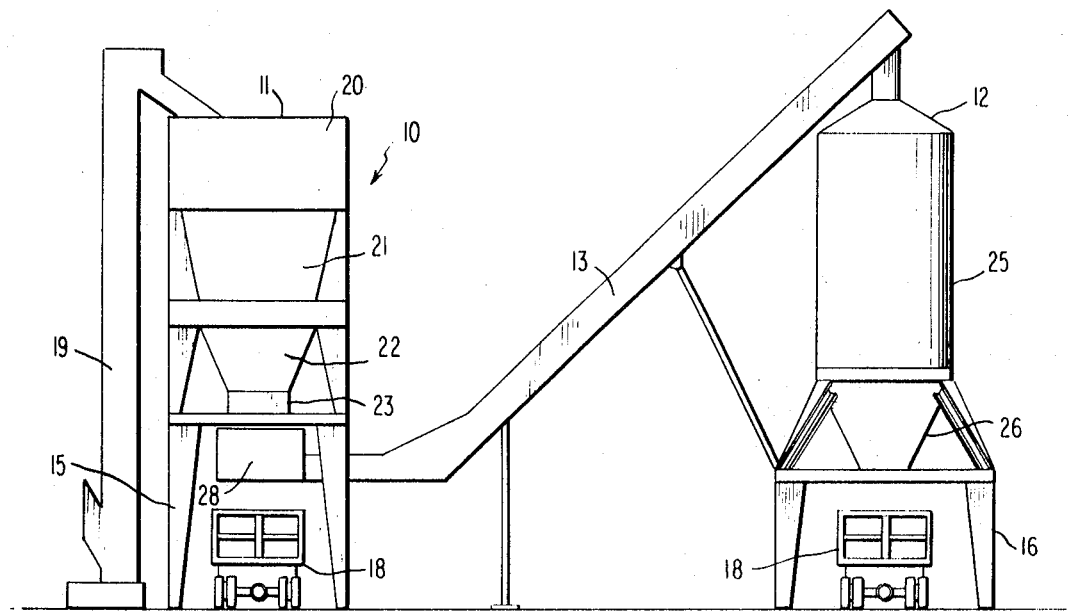
FIG. 1 is a side elevational view of a hot mix preparation and storage plant and the connecting conveyor apparatus.

Referring now in more detail to the drawing, in which like numerals indicate like parts throughout the several views, hot mix preparation and storage plant 10 comprises mix preparation plant 11, surge bin or heated storage silo 12, and mix transfer or conveyor apparatus 13. Both mix preparation plant 11 and surge bin 12 are elevated by support legs 15 and 16, respectively, so that a truck 18 or similar vehicle can be driven beneath the mix preparation plant or the surge bin and hot mix can be dispensed directly into the bed of the truck. Mix preparation plant 10 includes an aggregate elevator 19, an aggregate grader 20, aggregate storage bins 21, batcher 22, and pugmill 23. Conveyor apparatus 13 is a drag chain conveyor and has its entrance end positioned beneath pug mill 23 and functions to transfer the hot mix from mix preparation plant 11 to the upper portion of surge bin 12. Surge bin 12 comprises a large cylindrical storage tank 25 which converges at its bottom to form a funnel shaped discharge 26.

Figure 3:
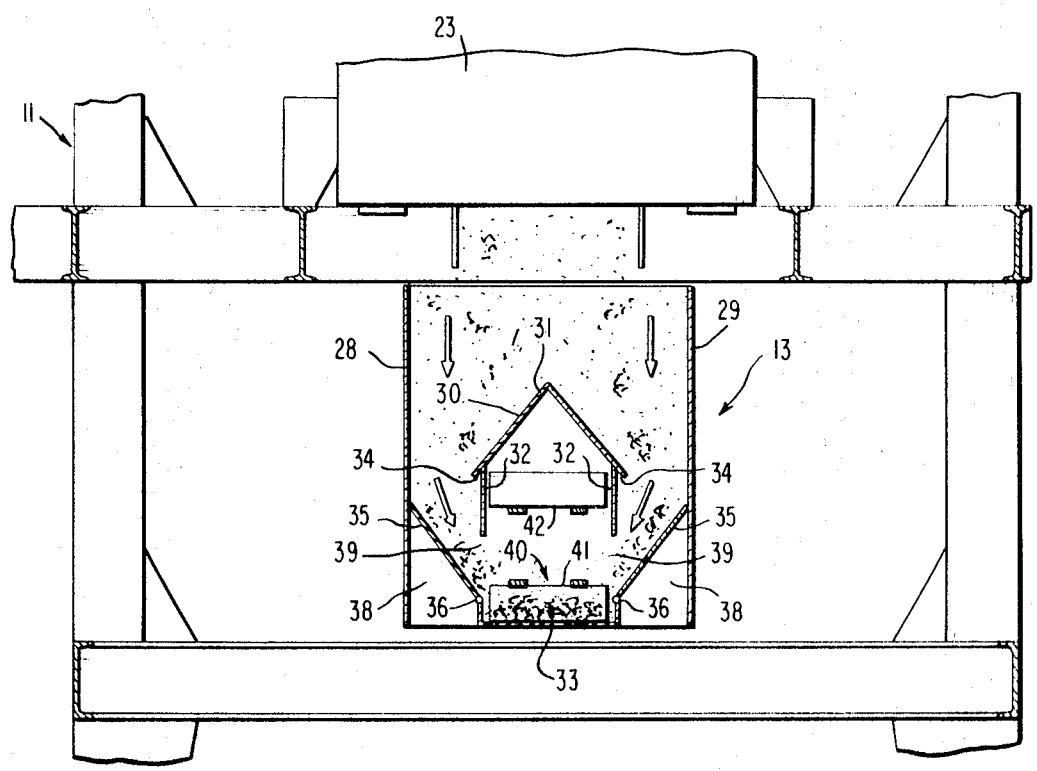
FIG. 3 is a side elevational view of the lower portion of the mix preparation plant, similar to FIG. 2, but showing the manner in which the mix preparation plant communicates with the conveyor apparatus.
Figure 2:
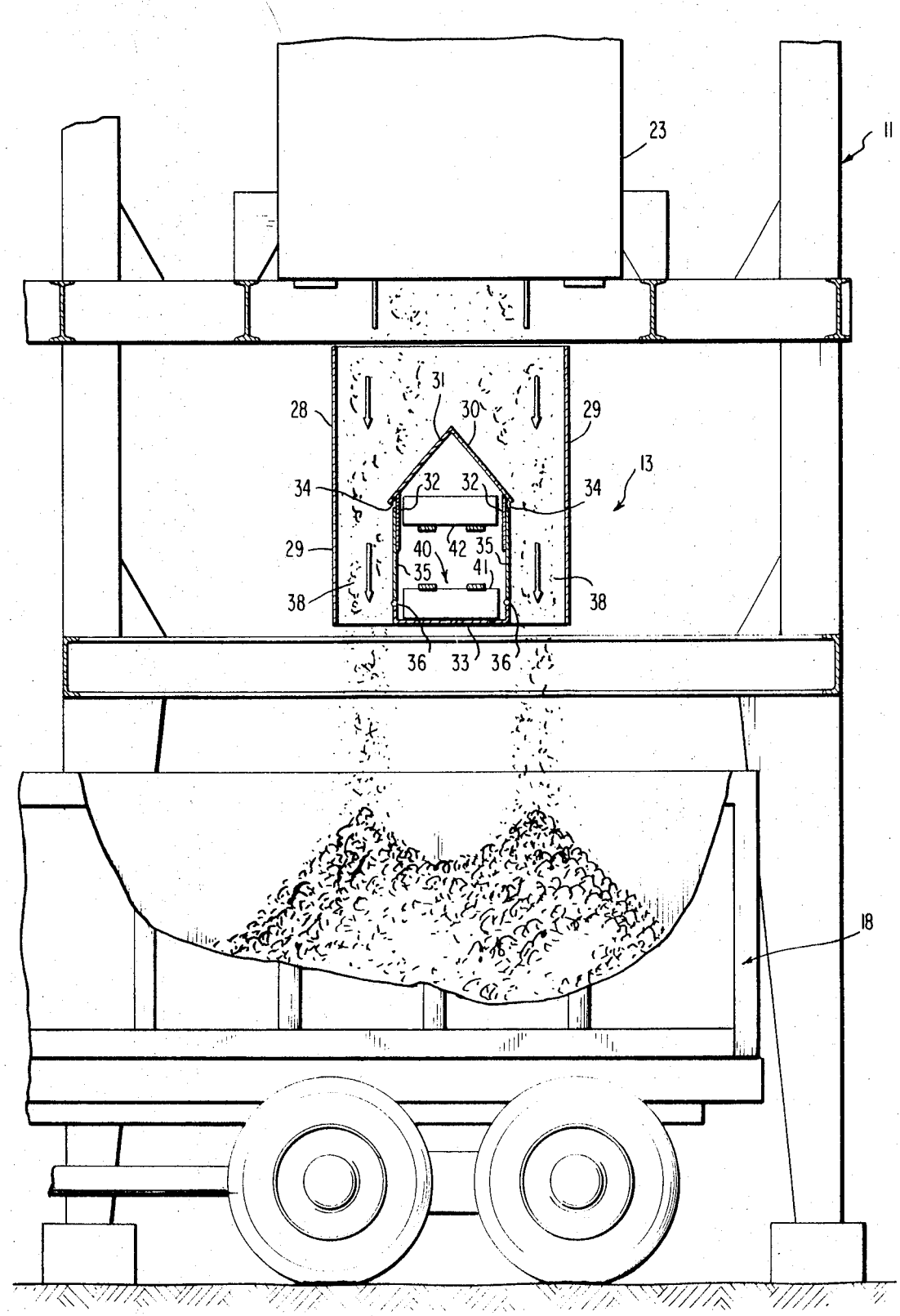
FIG. 2 is a schematic side elevational view of the lower portion of the mix preparation plant and the end of the conveyor mechanism, showing the manner in which communication between the mix preparation plant and conveyor mechanism is closed off while the mix is dispensed to the bed of a truck positioned below the mix preparation plant.

As is best shown in FIGS. 2 and 3, the end of conveyor apparatus 13 which is located beneath pug mill 23 of hot mix preparation plant 11 comprises outer housing 28 which includes sidewalls 29 and end walls (not shown) and which is open at its upper and lower ends. Housing 28 is positioned directly beneath the outlet opening of pug mill 23, so that the hot mix dispensed from the pug mill will flow into housing 28.

Smaller housing 30 is positioned within housing 28 and is displaced from its sidewalls 29. Smaller housing 30 includes a top wall or shed 31 which is peaked at its center and slopes in downward directions toward sidewalls 29 of outer housing 28. Vertical baffles 32 are positioned inwardly of the lower edges of shed 31 and define overhanging eaves 34 at the lower edges of shed 31. Bottom wall 33 extends across the bottom of housing 28 and is coextensive with the bottom wall of the inclined bottom of conveyor apparatus 13. Valve gates 35 are located generally below eaves 34 and each gate is pivotal about a hinge 36 at its lower edge to an upright position beneath an eave 34 of shed 31 (FIG. 2) or to an upwardly and outwardly sloped position into engagement with a sidewall 29 of outer housing 28 (FIG. 3). When valve gates 35 are both in upright positions, they are disposed adjacent vertical baffles 32, and vertical baffles 32 prevent valve gates 35 from moving beyond a vertical position.

Valve gates 35 define with sidewalls 29 of outer housing 28 a pair of dispensing channels 38 on opposed sides of smaller housing 30, so that the mix discharged from pugmill 23 can part at the ridge of shed 31 and pass around smaller housing 30 and be dispensed through channels 38 to the bed of the truck positioned below mix preparation plant 11. When valve gates 35 are pivoted about their hinges 36 so that their upper edges engage the walls 29 of outer housing 38, dispensing channels 38 are blocked or closed, and openings 39 (FIG. 3) are formed between the lower edges of vertical baffles 32 and the bottom wall portion 33 of smaller housing 30. The sloped valve gates 35 form deflectors or baffles which function to guide the mix discharged from pugmill 23 through the side openings 39 of smaller housing 30.

Conveyor apparatus 13 comprises drag chain conveyor 40 which has its receiving end projected into smaller housing 30 and includes lower and upper flights 41 and 42, respectively. Drag chain conveyor 40 is constructed in the conventional manner and extends in a substantially horizontal direction from beneath mix preparation plant 11 (FIG. 1) and then turns to an upwardly sloped direction toward the upper portion of surge bin 12. Lower flight 41 of drag chain conveyor 40 passes closely adjacent bottom wall 33 of smaller housing 30, and bottom wall 33 is coextensive with the portion of the housing of drag chain conveyor 40 which extends horizontally from mix preparation plant 11. Upper flight 42 passes through the upper portion of smaller housing 30, and vertical baffles 32 project to a level below the path of travel of upper flight 42. With this arrangement, baffles 32 function to guide the hot mix flowing from pugmill 23 to a level lower than the path of upper flight 42, while valve gates 35 function to guide the hot mix into the space between lower and upper flights 41 and 42 of the conveyor, so that the mix falls toward bottom wall 33 of smaller housing 30 where lower flight 41 of the conveyor drags the mix from smaller housing 30 and up the incline of the conveyor apparatus toward the upper portion of surge bin 12.

OPERATION

Mix preparation plant 11 functions in the conventional manner in that aggregate is placed in elevator 19 and carried in an upward direction toward aggregate grader 20. The aggregate is sized in grader 20 and deposited in various ones of the storage bins 21. The aggregate is dispensed from one or more of storage bins 21 into batcher 22, and the mixture of aggregates in batcher 22 is eventually deposited in pugmill 23 where it is mixed with a bituminous liquid. After the mixing step has been completed in pugmill 23, the hot mix is allowed to pass from pugmill 23 through outer housing 28. If a truck 18 is positioned below mix preparation plant 11 and ready to receive hot mix, valve gates 35 will be moved by a lever mechanism (not shown) to their vertical position beneath eaves 34, and the hot mix will fall to the top wall or shed 31 of smaller housing 30 where it will be guided by the sloping surfaces of shed 31 to dispensing channels 38, and will be dispensed through the lower opening of outer housing 28 to the truck.

After one or more batches of hot mix have been dispensed in this manner to fill truck 18, valve gates 35 will be pivoted about their hinges 36 until their upper edges engage sidewalls 29 of outer housing 28. Truck 18 can then be removed from beneath mix preparation plant 11 and the mix from pugmill 23 will then be guided by the sloping valve gates 35 into the inner portion of smaller housing 30. Vertical baffles 32 will keep the hot mix from engaging upper flight 42 of drag chain conveyor 40, while valve gates 35 guide the mix toward bottom wall 33 of smaller housing 30 where the lower flight 41 of the drag chain conveyor functions to remove the hot mix from the vicinity of mix preparation plant 11 and carry the mix to the upper portion of surge bin 12 where it is deposited into the surge bin. The conveyor will continue to operate for an indefinite time period to transfer mix to the surge bin until another truck 18 is available beneath mix preparation plant 11, whereupon valve gates 35 can be pivoted back to their vertical positions to dispense hot mix to the truck.

Eaves 34 beneath the sloping walls of shed 31 provide clearance for the upper edges of valve gates 35, so that when the valve gates are in their vertical positions the hot mix passing through dispensing channels 38 defined between valve gates 35 and sidewalls 29 of outer housing 28 will not contact the upper edges of the valve gates. Thus, the force applied to valve gates 35 to maintain them in their closed or vertical position is relatively small, and there is substantially no hazard of having the valve gates inadvertently moved to their sloped positions due to the turbulence of the flowing mix. Furthermore, when valve gates 35 are moved to their sloped positions (FIG. 3), they are supported at their lower edges by hinges 36 and at their upper edges by their upper edges engaging sidewalls 29 of outer housing 28, so that the flowing mix and the weight of the valve gates function to maintain the valve gates in this position. The arrangement is such that there is virtually no hazard of the flowing mix inadvertently moving the valve gates from their sloped positions (FIG. 3) where they block dispensing channels 38 toward their vertical positions (FIG. 2) where they block openings 39 in smaller housing 30.

Under normal conditions valve gates 35 will be pivoted together so that both valve gates 35 are either in their vertical positions or in their sloped positions, to channel all of the mix through dispensing channels 38 toward a waiting truck 18 or through openings 39 toward drag chain conveyor 40. Also, under normal conditions valve gates 35 will be pivoted between batches of mix; that is, valve gates 35 will remain either in their sloped or vertical positions throughout the entire dispensing of a batch of hot mix from pugmill 23, and then will be pivoted to the new position between the flowing of batches. However, if it is desirable to terminate the flow of hot mix through dispensing channels 38 in the middle of a batch flowing from pugmill 23, the construction of valve gates 35 is such that they can be pivoted from a vertical position to a sloped position without danger of damage to the elements of the structure, which allows an exact volume of hot mix to be dispensed from the mix preparation plant 11 without having to mix a smaller batch within pugmill 23 and to terminate the dispensing of hot mix abruptly, as in an emergency situation. Furthermore, it is possible to move valve gates 35 from a sloped position to a vertical position in the middle of a batch of flowing mix; however, the force required to move valve gates 35 under these circumstances to cause them to move to their vertical positions is larger than that required between the dispensing of batches of mix.

While this invention has been described in detail with particular reference to preferred embodiments thereof, it will be understood that variations and modifications can be effected within the spirit and scope of the invention as described hereinbefore and as defined in the appended claims.

I claim:

1. In a plant for preparing and storing a hot asphalt mix or the like including a first elevated structure for preparing the mix and dispensing the mix from the lower portion thereof to a truck or the like located below said first elevated structure, and a second elevated structure for storing the mix and dispensing the mix from the lower portion thereof to a truck or the like located below said second elevated structure, the combination therewith of mix transfer means extending from the lower portion of said first elevated structure to the upper portion of said second elevated structure and comprising a first housing having side and end walls and being substantially open at its top and bottom position below the outlet of said first elevated structure, a smaller housing located substantially within said first housing and spaced inwardly of the sidewall of said first housing, said smaller housing including door members on opposed sides thereof hinged about laterally extending axes at their lower ends and movable to a vertical position to substantially close said smaller housing from said first housing and movable into sloping engagement with the sidewalls of said first housing to open the sides of the smaller housing to said first housing, and conveyor means positioned in said smaller housing and extending outwardly of said smaller housing toward the upper portion of said second elevated structure, so that when the door members of said smaller housing are in their vertical closed positions mix is dispensed from said first elevated structure through said first housing and around said smaller housing to a truck or the like positioned below said first elevated structure, and when the door members of said smaller housing are opened into sloping engagement with the sidewalls of said first housing mix is dispensed from said first elevated structure through said first housing and into said smaller housing and transferred by said conveyor means toward the upper portion of said second elevated structure.

2. The invention of claim 1 wherein said smaller housing comprises a sloped top wall structure.

3. The invention of claim 1 wherein said conveyor means includes a drag chain conveyor extending into said smaller housing.

4. In a plant for preparing and storing a hot asphalt mix or the like comprising an elevated mix preparation plant including means for dispensing hot asphalt mix from its lower portion, an elevated storage silo, and a drag chain conveyor extending from the lower portion of the mix preparation plant to an upper portion of the elevated storage silo, the combination therewith of gate means connected to the lower portion of said mix preparation plant constructed to alternately divert hot mix dispensed from said mix preparation plant to said drag chain conveyor or around opposite sides of said drag conveyor.

5. The invention of claim 4 wherein said drag chain conveyor includes upper and lower flights, and wherein said gate means comprises door members movable between upright positions on opposite sides of said conveyor to block entrance to the lower flight of the conveyor and upwardly and outwardly sloped positions to form feed ramps to guide the mix toward the lower flight of the conveyor.